United States Patent [19]

Knapp

[11] 4,353,578
[45] Oct. 12, 1982

[54] AUTOMOBILE FRAME CONVERSION UNIT
[75] Inventor: Gerald W. Knapp, Cokato, Minn.
[73] Assignee: Elite Enterprises Inc., Minn.
[21] Appl. No.: 197,913
[22] Filed: Oct. 17, 1980
[51] Int. Cl.³ .............................................. B62D 21/00
[52] U.S. Cl. .................................. 280/781; 180/89.1; 280/788; 280/796; 296/194; 296/204
[58] Field of Search ...................... 280/80 R, 781, 788, 280/796; 180/83.1; 296/187, 194, 204; 188/33

[56] References Cited
U.S. PATENT DOCUMENTS 2,388,419  11/1945  Komenda ........................... 180/89.1
3,942,817   3/1976  Weiffenbach ..................... 280/80 R
4,180,228  12/1979  Snyder .................................. 188/33

*Primary Examiner*—Joseph F. Peters, Jr.
*Assistant Examiner*—John A. Carroll
*Attorney, Agent, or Firm*—James R. Cwayna

[57] ABSTRACT

A unit for modifying the automobile frame of a Volkswagen, VW, Super Beetle to accommodate a standard Volkswagen, VW, ball joint torsion bar front assembly including the wheel mounting assembly thereon. The unit includes a rearwardly directed clamping structure which includes a pair of spaced apart clamp plates for clamping about the tunnel portion of the VW, Super Beetle framework and a forwardly directed clamping assembly for mounting the standard assembly thereon by providing spaced apart clamping elements to receive and clamp the torsion bar housings of the front axle assembly therein.

7 Claims, 9 Drawing Figures

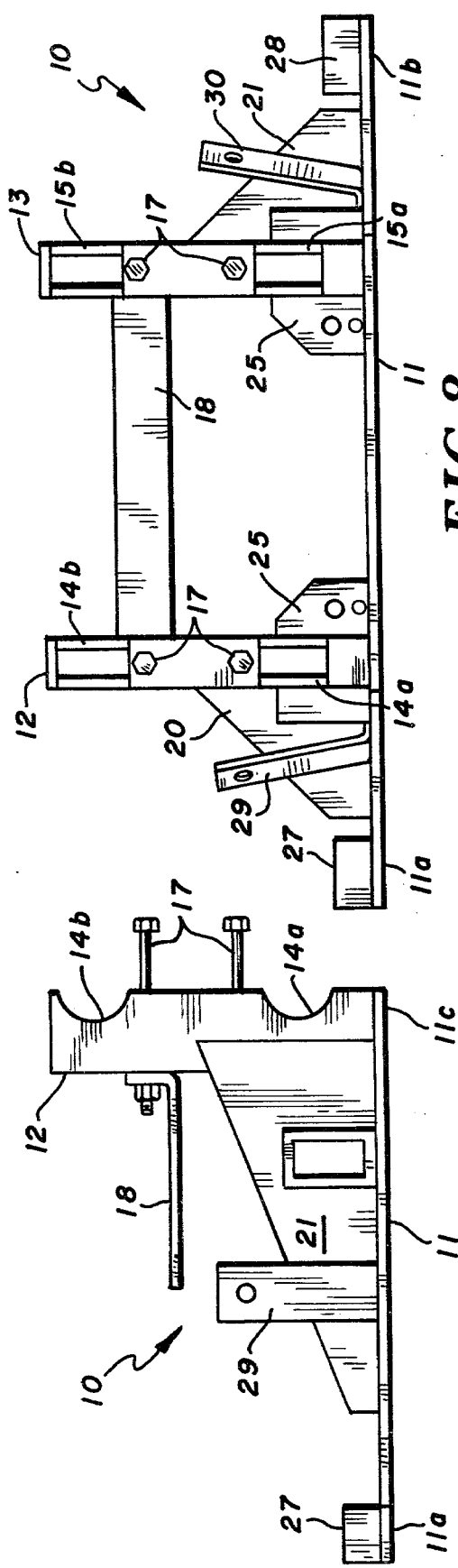
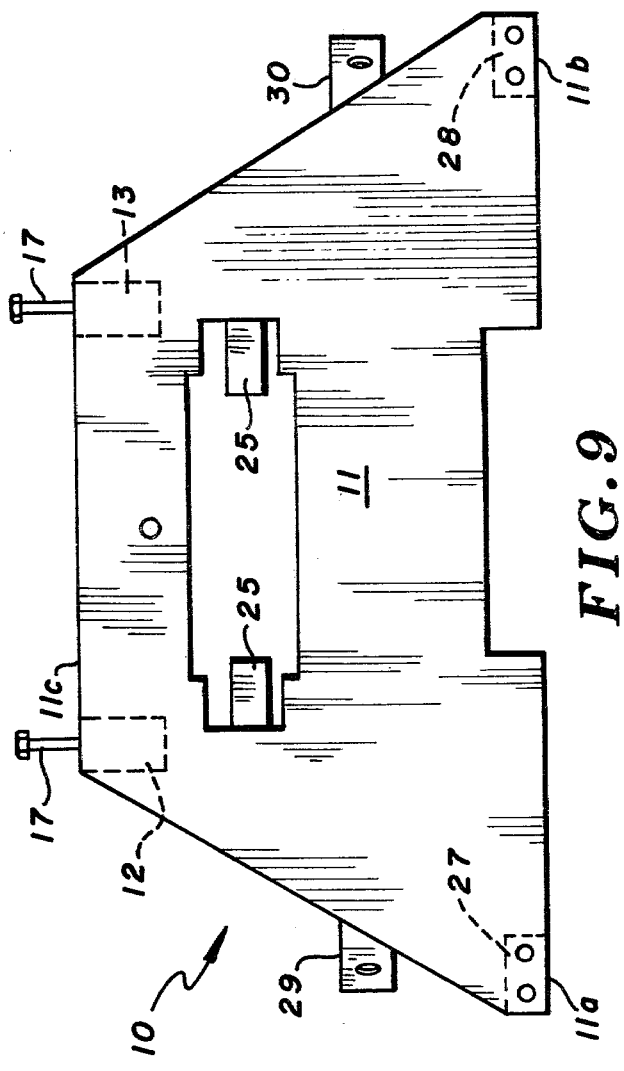

AUTOMOBILE FRAME CONVERSION UNIT

FIELD OF THE INVENTION

This invention relates generally to a unit for the modification of automobile frames to allow for the conversions thereof and more particularly to an automobile frame modification unit which will allow the adaptation of a standard Volkswagen ball joint, torsion bar front assembly to the frame and chassis of a VW Super Beetle.

BACKGROUND AND OBJECTS OF THE INVENTION

The present invention is directed to a unit which will permit the modification of a Volkswagen, VW, Super Beetle chassis for use as a Kit Car or Dune Buggy. This terminology is well understood in the industry and the Kit Car and Dune Buggy industry has provided a great economical surge in the automobile after market.

A standard unit for these modifications is the Volkswagen. While the utilization and modification of Volkswagen units has been enjoyed, to this point, the Volkswagen Super Beetle has not been used for such modifications. The Super Beetle was originally developed with what is known in the art as a McPhearson suspension and no modification for such a unit has been developed to this time. The use of a Super Beetle frame and chassis for such conversions is the object of this invention and application and it is therefore an object of this invention to provide an automobile conversion unit which permits the modification of a Volkswagen Super Beetle to incorporate a standard or stock Volkswagen ball joint torsion bar to such Super Beetle framework and chassis.

In the applicant's consideration of the art related to this concept, the only patent reference available is that of a patent to Wieffenback, issued Mar. 19, 1976, U.S. Pat. No. 3,942,817, and entitled Extension for Car Frame. This particular patent is directed to a unit for extending the length of a Volkswagen, VW, frame to particularly accomodate the mounting of long front hood car bodies thereon. The disclosure of this patent relates to an intermediate frame section which is attached to an existing VW frame and which extends forwardly therefrom to permit mounting the normally provided front axle thereon. The device is no more than a simple extension of the provided frame and, as stated in the disclosure of the patent, permits the VW frame to receive relatively "long bodied" antique or "futuristic" car designs. There is no showing nor consideration of this modification to permit utilization of the VW Super Beetle frame for such or similar conversions.

It is therefore an object of the applicant's invention to provide an automobile frame modification or conversion unit which provides for the adaptation of a Super Beetle frame or chassis to receive a standard or stock VW ball joint torsion bar front axle and wheel assembly.

It is a further object of the applicant's invention to provide a a frame modification unit for particular use on a Super Beetle frame or chassis which allows the bolting of the adaptor unit to the same and which allows the boltable attachment of a standard VW front axle assembly thereto.

These and other objects and advantages of the applicant's invention will appear from a consideration of the accompanying drawings and disclosure.

DESCRIPTION OF THE DRAWINGS

FIG. 7 is a side elevation of the unit as illustrated in FIG. 5;

FIG. 8 is a front elevation of the unit as illustrated in FIG. 5; and,

FIG. 9 is a bottom plan view of the unit as illustrated in FIG. 5.

DESCRIPTION OF A PREFERRED FORM OF THE INVENTION

Figure 1:
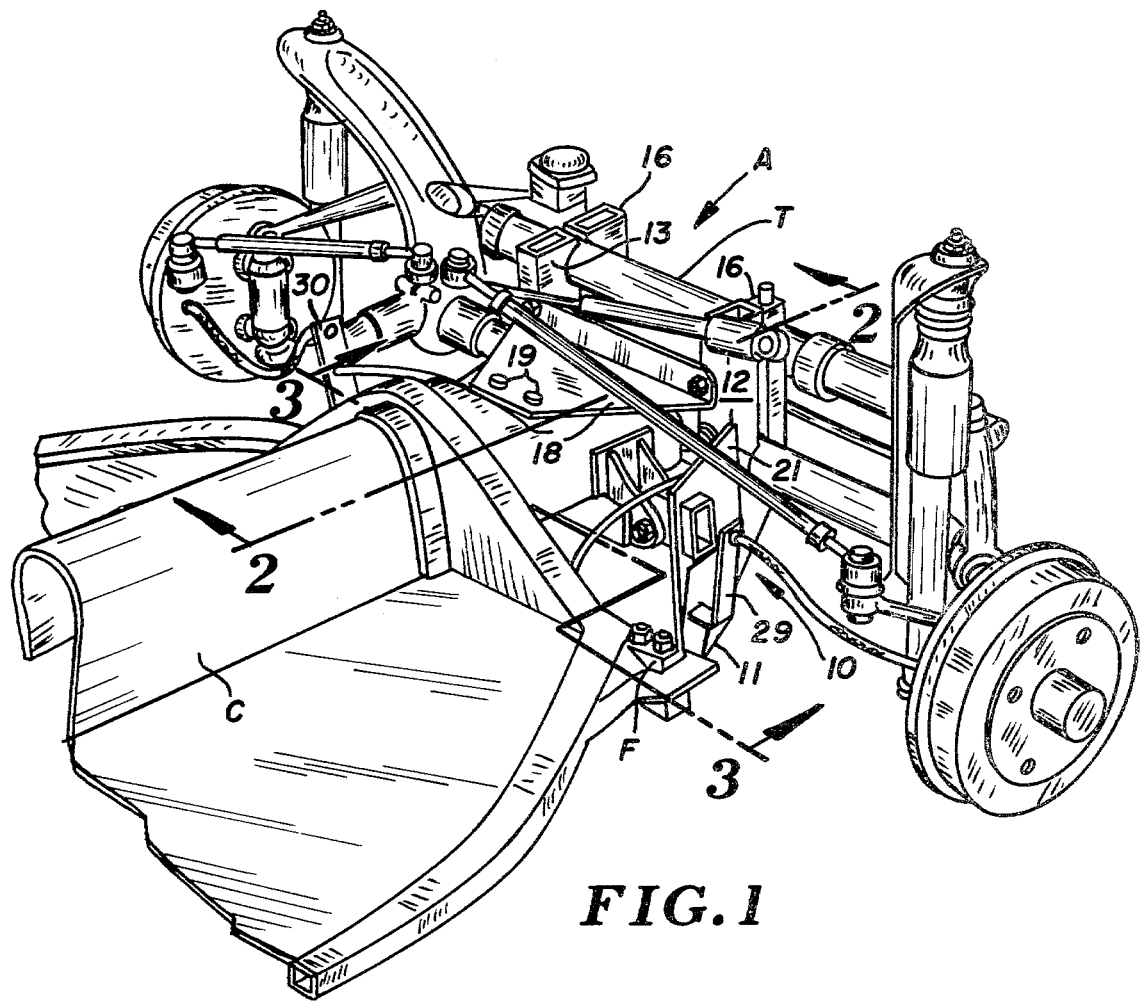
FIG. 1 is a perspective view of the entire front frame or chassis portion of a Super Beetle as the same is modified to accept a standard or stock VW ball joint torsion bar front assembly which includes the conversion unit which is the subject matter of this invention.
Figure 2:
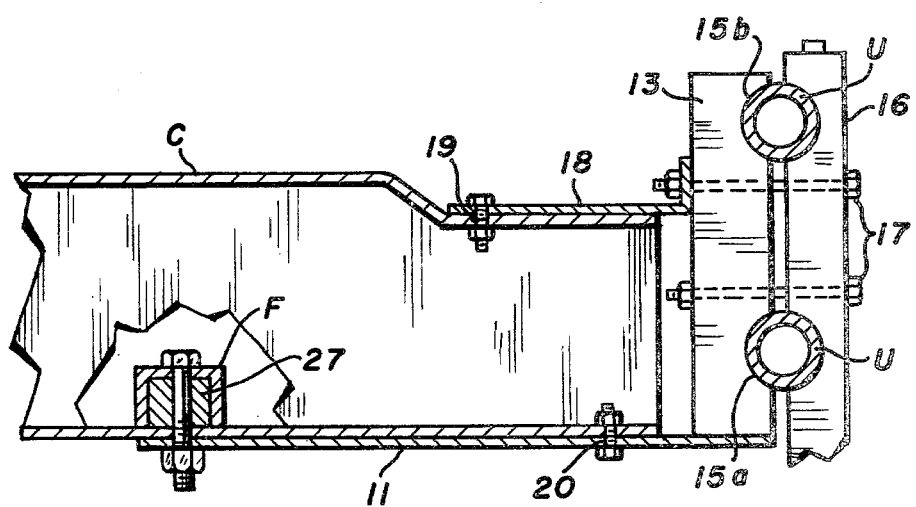
FIG. 2 is a vertical section taken substantially along Line 2—2 of FIG. 1 and particularly illustrating the attachment arrangement for securing the unit of the invention to the frame of the VW Super Beetle.
Figure 3:
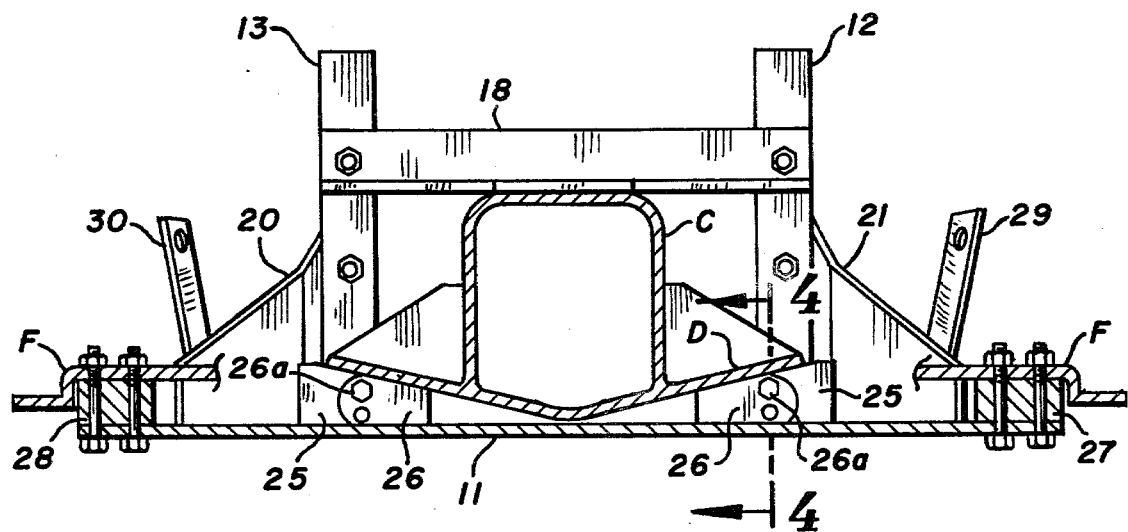
FIG. 3 is a vertical section taken substantially along Line 3—3 of FIG. 1.
Figure 4:
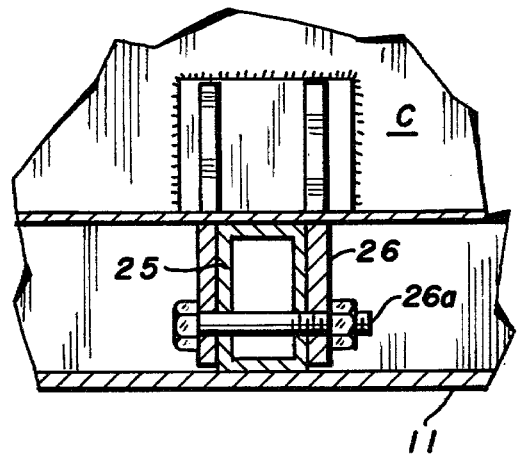
FIG. 4 is a vertical section taken substantially along Line 4—4 of FIG. 3.
Figure 5:
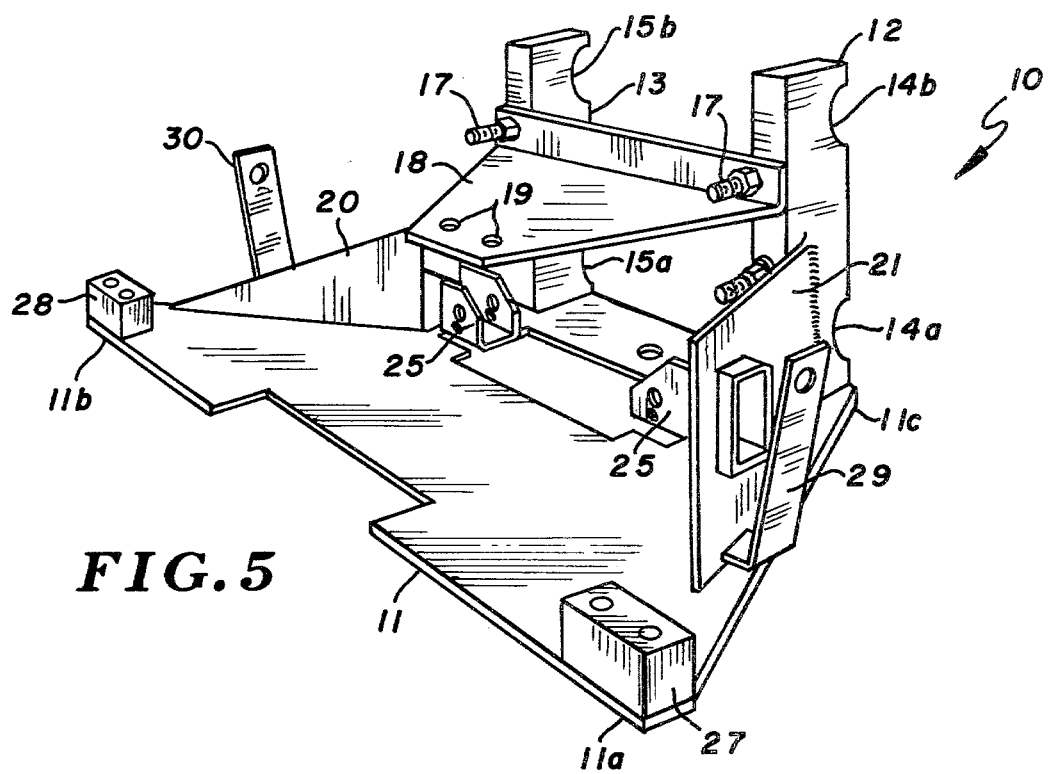
FIG. 5 is a perspective view of the invention.
Figure 6:
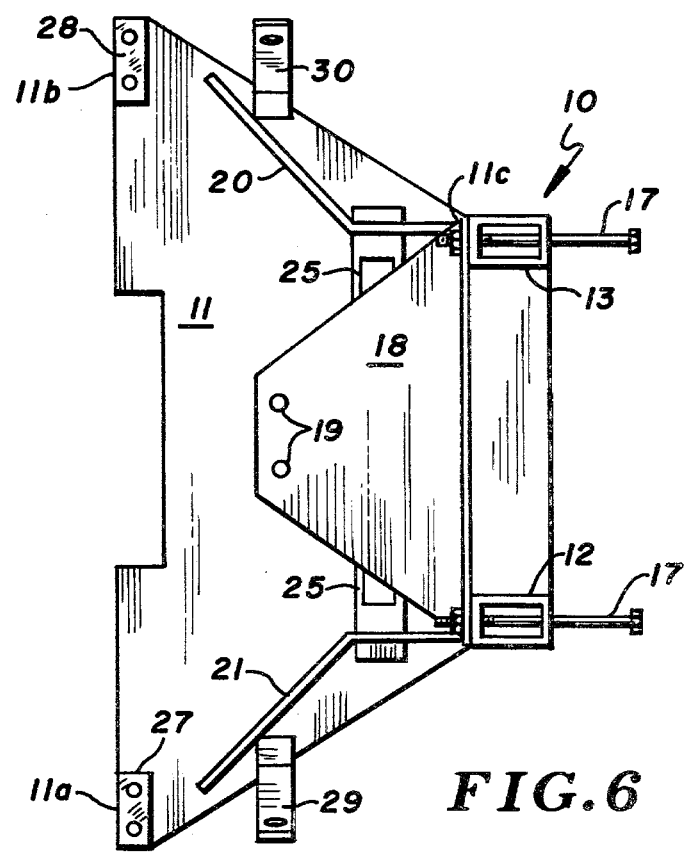
FIG. 6 is a top plan view of the unit as illustrated in FIG. 5.

In accordance with the accompanying drawings, the modification unit embodying the concepts of the applicant's invention is illustrated in its separate form in FIGS. 5 through 9 and is illustrated in modifying position on a VW Super Beetle chassis or frame to receive a stock or standard VW ball joint torsion bar front assembly as shown in FIGS. 1 through 4. In the various views, the unit embodying the applicant's invention is designated in its entirety as 10 and the Super Beetle chassis is designated C and the standard front assembly is designated A. The frontal assembly includes the torsion bar housings T, steering linkages, shock absorbers and wheel rims and wheel assemblies which are common to such a frontal assembly with the only designation being given to the torsion bar housings being individually designated with the indicia U. A further frame designation F is utilized to designate an outwardly directed portion of the Super Beetle frame and reference is made herein to the tunnel of the chassis and frame, such tunnel structure being common to the Volkswagen framework.

In the installation of this conversion unit 10, it is necessary to cut or otherwise remove the normal McPhearson suspension from the forwardmost portion of the Super Beetle chassis or frame C and this is accomplished by cutting the forwardmost portion of the tunnel unit. This removal prepares the chassis for the installation of the modification unit 10 with the exception of the drilling of several holes for attachment elements which are described herein but, it should be stated, this modification unit may be installed without welding or similar, permanent operations.

The modification unit 10 is provided with a rearwardly extending clamping assembly including a first, lower, trapezoidal shaped member 11 arranged to underlie the forwardmost portion of the chassis and which, due to the designed trapezoidal shape, provides transversely extending attachment portions 11a, 11b on the rearward end thereof to be in alignment with the aforementioned frame portion F and a vertically spaced, upper clamping plate member designated 18. The chassis or frame or tunnel portion of the Super Beetle is arranged between this lower and upper plate 11, 18 and is secured therebetween. Arranged on the forward end of the lower plate member 11 is a pair of vertically upstanding, horizontally spaced torsion unit receiving members designated respectively 12, 13. These members 12, 13 are each provided with a vertically spaced recesses 14a, 14b, 15a, 15b such that the torsion bar units U may be received therein and positioned with respect to the frame of the automobile. A further, forwardly arranged clamping member 16 is provided for each of the receiving members 12, 13 and attachment elements 17 are provided to extend through such clamp units to secure the torsion bar members or housings to the vertical elements 12, 13.

The upper clamping plate 18 is arranged to extend between the vertical members 12, 13 and thereby provides lateral stability to the same and, in combination with such vertical elements 12, 13 and the lower plate 11, provides a rearwardly "C" shaped member to receive the chassis portion C therebetween. As illustrated, the upper clamping plate 18 may be "L" shaped at its forward end to provide additional ridigity to the vertical members 12, 13 and the upper of the attachment members 17 will then pass therethrough.

Gussetting members 20, 21 are provided to extend upwardly and forwardly from the lower clamping plate 11 to the vertical members 12, 13 inwardly directed, rectangularly apertured members 25, 25 are provided on each of such gussets. Arranged inwardly of each of these apertured members 25, 25 are individual tunnel contacting support elements 26 which abut with the underside of an outwardly and upwardly directed tunnel portion D (see FIG. 3). These support elements form part of the tunnel portion and attachment members 26a are received therethrough for securing these unit and frame portions together.

As illustrated in the various views, it is necessary to rigidly attach the unit 10 to the chassis C and such attachment means includes bolted connections 19, 19 on the upper plate member 18, attachment means 20 through the lower plate member 11 and bosses or spacer elements 27, 28 on the outermost portions of the lower plate member 11 with apertures passing therethrough to accomodate attachment of the ends through the aforementioned frame portion F.

The unit 10 as described and illustrated provides a unit which will capture the forwardmost end of the tunnel a Super Beetle chassis and will, through the trapezoidal construction thereof provide a lateral stability to the joinder of the two units. The "C" shaped construction of the rearwardly directed clamping portion provides a high degree of contact and clamping area and permits the conversion operation through the use of attachment bolts and nuts and therefore eliminates any welding that is normally associated with such conversion processes.

The applicant further provides a pair of vertically arranged brake line support members 29, 30 which are spaced upon the outer edges of the lower plate 11 and are provided as brake line receiving elements for properly locating the same.

The basic concept of the applicant's invention is to provide an automobile conversion unit which allows the installation of a standard or stock VW ball joint torsion bar front axle assembly upon a Super Beetle frame and this is achieved with the use of the substantially "C" shaped mounting plate structure which is receivable both below and above the Super Beetle chassis tunnel with attachment means being provided into the tunnel area and with lateral stability being further achieved with the trapezoidal structure of the unit to allow attachment to be made in a transverse dimension from the tunnel portion.

It should be obvious that the applicant's invention provides a unique conversion unit for the changing of a front axle assembly of an automobile frame such that normally unusable frames may now be modified and affixed with standard ball joint torsion bar front axle assemblies.

What is claimed is:

1. An automobile frame conversion unit for the replacement of a normally provided first front axle assembly of the automobile with a second selected front axle assembly, the automobile frame including a forwardly extending tunnel chassis and the second selected front axle assembly including a pair of vertically spaced torsion bar members, said conversion unit including:
   a. a rearwardly directed tunnel clamping assembly including a pair of vertically spaced plate members received on vertically opposite sides of the tunnel portion of the frame with means for clamping said tunnel therebetween;
   b. a forwardly directed clamping assembly including a pair of first horizontally spaced, vertically upstanding elements secured to the lower of said vertically spaced plate members and extending upwardly therefrom, each of said first upstanding elements includes recessed portions which receive said torsion bar members;
   c. means for securing the upper portions of said upstanding elements to said upper plate of said clamping assembly;
   d. a pair of second horizontally spaced, vertically upstanding elements, each of said second upstanding elements includes recessed portions which receive said torsion bar members; and,
   e. a pair of clamp members which clamp said second upstanding elements to said first upstanding elements with said torsion bars received in said recessed portions.

2. The structure set forth in claim 1 and gussetting support members provided from said lower of said plate members to each of said torsion bar members.

3. The structure set forth in claim 1 and means carried by and attached to the lower of said vertically spaced plate members for engagement with selected side porof the tunnel portion of the automobile frame.

4. The structure set forth in claim 1 and a pair of upwardly disposed brake line support elements mounted on the lower of said vertically spaced plate members and being arranged on the outer edges thereof.

5. The structure set forth in claim 1, said rearwardly directed clamping assembly being arranged and constructed to permit the tunnel portion of the frame to extend inwardly into the clamping area to bring the end thereof into close association with said vertically upstanding elements of said forwardly directed clamping assembly.

6. The structure set forth in claim 1 and said upper and lower plate members of said tunnel clamping assembly being substantially trapezoidal in shape.

7. The structure set forth in claim 6 and spacer elements arranged on said lower plate member for abutment with the tunnel chassis to provide lateral and horizontal positioning thereto.

* * * * *